United States Patent
Sun et al.

(10) Patent No.: US 11,295,565 B2
(45) Date of Patent: *Apr. 5, 2022

(54) SECURE SMART UNLOCKING

(71) Applicant: Advanced New Technologies Co., Ltd., Grand Cayman (KY)

(72) Inventors: Xi Sun, Hangzhou (CN); Hongwei Luo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,812

(22) Filed: Apr. 29, 2021

(65) Prior Publication Data

US 2021/0248849 A1 Aug. 12, 2021

Related U.S. Application Data

(63) Continuation of application No. 16/945,591, filed on Jul. 31, 2020, now Pat. No. 10,997,808, which is a
(Continued)

(30) Foreign Application Priority Data

Jun. 28, 2019 (CN) .......................... 201910576565.7

(51) Int. Cl.
*G07C 9/00* (2020.01)
*H04L 9/08* (2006.01)

(52) U.S. Cl.
CPC ..... *G07C 9/00309* (2013.01); *G07C 9/00857* (2013.01); *G07C 9/00896* (2013.01);
(Continued)

(58) Field of Classification Search
CPC ............ G07C 9/00309; G07C 9/00896; G07C 9/00857; G07C 2009/00507;
(Continued)

(56) References Cited

U.S. PATENT DOCUMENTS 5,745,044 A 4/1998 Hyatt, Jr. et al.
6,005,487 A 12/1999 Hyatt, Jr. et al.
(Continued)

FOREIGN PATENT DOCUMENTS

CN 101046132 10/2007
CN 101619632 1/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Nam V Nguyen
(74) *Attorney, Agent, or Firm* — Fish & Richardson P.C.

(57) ABSTRACT

The present application provides an unlocking solution. In this solution, after obtaining a digital key seed, a user mobile device can generate a digital key for multiple times by using the digital key seed and first check data corresponding to a current unlocking operation, and then send the digital key to a smart door lock for verification and unlocking. Because the digital key includes the first check data only corresponding to the current unlocking operation, an attacker cannot use the digital key to perform unlocking again even if the attacker obtains the digital key. In addition, because the digital key seed can be used for multiple times, a smart door lock server does not need to be connected each time to obtain the digital key. Therefore, both security and ease of use are satisfied.

20 Claims, 4 Drawing Sheets

Related U.S. Application Data continuation of application No. 16/810,772, filed on Mar. 5, 2020, now Pat. No. 10,769,873, which is a continuation of application No. PCT/CN2020/071112, filed on Jan. 9, 2020.

(52) U.S. Cl.
CPC .. *H04L 9/0825* (2013.01); *G07C 2009/00412* (2013.01); *G07C 2009/00507* (2013.01)

(58) Field of Classification Search
CPC ...... G07C 2009/00412; G07C 9/00571; G07C 2009/00769; G07C 2209/08; H04L 9/0825; H04L 9/0869; H04L 9/088; H04L 9/3234; H04L 9/3247; H04L 9/3297
USPC .......................................... 340/5.65, 5.7, 5.8
See application file for complete search history.

(56) References Cited

U.S. PATENT DOCUMENTS

| | | | |
|---|---|---|---|
| 6,082,153 | A | 7/2000 | Schoell et al. |
| 7,012,503 | B2 | 3/2006 | Nielsen |
| 7,114,178 | B2* | 9/2006 | Dent .................. H04W 12/08 726/6 |
| 7,821,395 | B2* | 10/2010 | Denison ............. G07C 9/00896 340/568.2 |
| 8,723,641 | B2* | 5/2014 | Sadighi .................. G07C 9/27 340/5.61 |
| 8,904,180 | B2 | 12/2014 | Allen et al. |
| 8,909,937 | B2 | 12/2014 | Ruan et al. |
| 9,306,943 | B1 | 4/2016 | Bailey et al. |
| 9,449,448 | B2 | 9/2016 | Andersen |
| 9,626,859 | B2 | 4/2017 | Ribas et al. |
| 9,841,743 | B2* | 12/2017 | Davis .................. G05B 19/02 |
| 9,842,446 | B2* | 12/2017 | Vecchiotti ............... G07C 9/27 |
| 10,134,212 | B1 | 11/2018 | Ren et al. |
| 10,540,835 | B2* | 1/2020 | Kuenzi ............ G07C 9/00571 |
| 10,769,873 | B1 | 9/2020 | Sun et al. |
| 10,861,263 | B2* | 12/2020 | Ribas ................ G07C 9/00817 |
| 10,997,808 | B2* | 5/2021 | Sun ..................... H04L 9/088 |
| 11,049,341 | B2* | 6/2021 | Klink .................. H04L 63/108 |
| 2006/0255910 | A1 | 11/2006 | Fukushima et al. |
| 2007/0176739 | A1 | 8/2007 | Raheman |
| 2011/0179278 | A1 | 7/2011 | Kim |
| 2011/0264919 | A1 | 10/2011 | Pizano et al. |
| 2012/0075057 | A1 | 3/2012 | Fyke et al. |
| 2013/0085944 | A1 | 4/2013 | Fielder |
| 2013/0132717 | A1* | 5/2013 | Brand .................. H04L 9/3247 713/156 |
| 2013/0132731 | A1 | 5/2013 | Ruan et al. |
| 2013/0265167 | A1 | 10/2013 | Tilly et al. |
| 2014/0120905 | A1* | 5/2014 | Kim .................... H04W 12/068 455/426.1 |
| 2014/0232524 | A1 | 8/2014 | Nakai et al. |
| 2015/0082399 | A1 | 3/2015 | Wu et al. |
| 2015/0149042 | A1 | 5/2015 | Cooper et al. |
| 2015/0170447 | A1 | 6/2015 | Buzhardt |
| 2015/0221152 | A1 | 8/2015 | Andersen |
| 2015/0372813 | A1 | 12/2015 | Brand |
| 2016/0044472 | A1 | 2/2016 | Person |
| 2016/0241999 | A1 | 8/2016 | Chin et al. |
| 2016/0307380 | A1 | 10/2016 | Ho et al. |
| 2017/0006026 | A1 | 1/2017 | An et al. |
| 2017/0010592 | A1 | 1/2017 | Wiechers |
| 2017/0063549 | A1 | 3/2017 | Zwart et al. |
| 2017/0099140 | A1 | 4/2017 | Hoy et al. |
| 2017/0111353 | A1 | 4/2017 | Tschache et al. |
| 2018/0006812 | A1 | 1/2018 | Oberheide et al. |
| 2018/0077124 | A1 | 3/2018 | Ramoutar |
| 2018/0248704 | A1 | 8/2018 | Coode et al. |
| 2018/0268633 | A1 | 9/2018 | Kwon et al. |
| 2019/0097795 | A1 | 3/2019 | Yoon et al. |
| 2019/0130082 | A1 | 5/2019 | Alameh et al. |
| 2019/0245688 | A1 | 8/2019 | Patin |
| 2019/0354697 | A1 | 11/2019 | Aghdam et al. |
| 2019/0371105 | A1 | 12/2019 | Ye |
| 2019/0373437 | A1 | 12/2019 | Goodenough Welch et al. |
| 2020/0092101 | A1 | 3/2020 | Ajitomi et al. |
| 2020/0410796 | A1 | 12/2020 | Sun et al. |

FOREIGN PATENT DOCUMENTS

| | | |
|---|---|---|
| CN | 102013975 | 4/2011 |
| CN | 105015489 | 11/2015 |
| CN | 105939197 | 9/2016 |
| CN | 107609878 | 1/2018 |
| CN | 108667780 | 10/2018 |
| CN | 108683674 | 10/2018 |
| CN | 108986278 | 12/2018 |
| CN | 109242634 | 1/2019 |
| CN | 110473318 | 1/2019 |
| CN | 109905235 | 6/2019 |
| JP | 2699505 | 1/1998 |
| TW | 200805106 | 1/2008 |
| TW | 201329781 | 7/2013 |
| WO | WO 2006009517 | 1/2006 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln No. PCT/CN2020/071112, dated Mar. 27, 2020, 17 pages (with English translation).

* cited by examiner

SECURE SMART UNLOCKING

CROSS-REFERENCE TO RELATED APPLICATIONS

This application is a continuation of and claims the benefit of priority of U.S. patent application Ser. No. 16/945,591, filed Jul. 31, 2020, now U.S. Pat. No. 10,997,808, which is a continuation of and claims the benefit of priority of U.S. patent application Ser. No. 16/810,772, filed Mar. 5, 2020, now U.S. Pat. No. 10,769,873, which is a continuation of PCT Application No. PCT/CN2020/071112, filed on Jan. 9, 2020, which claims priority to Chinese Patent Application No. 201910576565.7, filed on Jun. 28, 2019, and each application is hereby incorporated by reference in their entirety.

TECHNICAL FIELD

The present application relates to the field of information technologies, and in particular, to unlocking methods, devices, and computer readable mediums.

BACKGROUND

Currently, smart door locks are more widely used. One of ways to operate the smart door lock is to use a digital key. In a specific method, a user accesses a smart door lock server by using a mobile device, and after performing verification on a user identity, the smart door lock server delivers a digital key to the user mobile device for storage on the user mobile device. When unlocking is needed, the user mobile device sends the digital key to a smart door lock by using a near field communications technology (e.g., NFC or Bluetooth), and the smart door lock performs verification on the digital key. If the verification succeeds, the smart door lock performs unlocking.

SUMMARY

An objective of the present application is to provide an unlocking solution, so as to alleviate a problem that both security and ease of use cannot be satisfied in an existing unlocking solution.

An implementation of the present application provides an unlocking method implemented on a user mobile device, and the method includes the following: obtaining, by the user mobile device, a digital key seed; generating, by the user mobile device, a digital key based on the digital key seed and first check content corresponding to a current unlocking operation; and sending, by the user mobile device, the digital key to a smart door lock, so that the smart door lock performs verification on the digital key seed and the first check content in the digital key, and performs unlocking after the verification succeeds.

An implementation of the present application further provides an unlocking method implemented on a smart door lock server, and the method includes the following: generating, by the smart door lock server, a digital key seed, and sending the digital key seed to a user mobile device, so that the user mobile device generates a digital key based on the digital key seed and first check content corresponding to a current unlocking operation, and sends the digital key to a smart door lock, and the smart door lock performs verification on the digital key seed and the first check content in the digital key, and performs unlocking after the verification succeeds.

An implementation of the present application further provides an unlocking method implemented on a smart door lock, and the method includes the following: receiving, by the smart door lock, a digital key from a user mobile device, where the digital key is generated by the user mobile device based on a digital key seed and first check content corresponding to a current unlocking operation; and performing, by the smart door lock, verification on the digital key seed and the first check content in the digital key, and performing unlocking after the verification succeeds.

Another aspect of the present application further provides a user mobile device for unlocking, and the user mobile device includes the following: a seed acquisition module, configured to obtain a digital key seed; a key generation module, configured to generate a digital key based on the digital key seed and first check content corresponding to a current unlocking operation; and a data sending module, configured to send the digital key to a smart door lock, so that the smart door lock performs verification on the digital key seed and the first check content in the digital key, and performs unlocking after the verification succeeds.

An implementation of the present application further provides a smart door lock server for unlocking, and the smart door lock server includes the following: a seed generation module, configured to generate a digital key seed; and a data transceiver module, configured to send the digital key seed to a user mobile device, so that the user mobile device generates a digital key based on the digital key seed and first check content corresponding to a current unlocking operation, and sends the digital key to a smart door lock, and the smart door lock performs verification on the digital key seed and the first check content in the digital key, and performs unlocking after the verification succeeds.

An implementation of the present application further provides a smart door lock for unlocking, and the smart door lock includes the following: a data transceiver module, configured to receive a digital key from a user mobile device, where the digital key is generated by the user mobile device based on a digital key seed and first check content corresponding to a current unlocking operation; a verification processing module, configured to perform verification on the digital key seed and the first check content in the digital key; and an unlocking action module, configured to perform unlocking after the verification succeeds.

In addition, some implementations of the present application further provide a computing device, where the device includes a memory configured to store a computer program instruction and a processor configured to execute the computer program instruction, and the device is triggered to perform the previously described unlocking methods when the processor executes the computer program instruction.

Some other implementations of the present application further provide a computer readable medium, where the computer readable medium stores a computer program instruction, and the computer readable instruction can be executed by a processor to implement the previously described unlocking method.

According to the solution provided in the implementations of the present application, after obtaining a digital key seed, a user mobile device can generate a digital key for multiple times by using the digital key seed and first check data corresponding to a current unlocking operation, and then send the digital key to a smart door lock for verification and unlocking. Because the digital key includes the first check data only corresponding to the current unlocking operation, an attacker cannot use the digital key to perform unlocking again even if the attacker obtains the digital key.

In addition, because the digital key seed can be used for multiple times, a smart door lock server does not need to be connected each time to obtain the digital key. Therefore, both security and ease of use are satisfied.

BRIEF DESCRIPTION OF DRAWINGS

Other features, objectives, and advantages of the present application become more clear by reading detailed descriptions of the non-limitative implementations with reference to the following accompanying drawings.

Same or similar reference numerals in the accompanying drawings represent same or similar components.

DESCRIPTION OF IMPLEMENTATIONS

Figure 1:
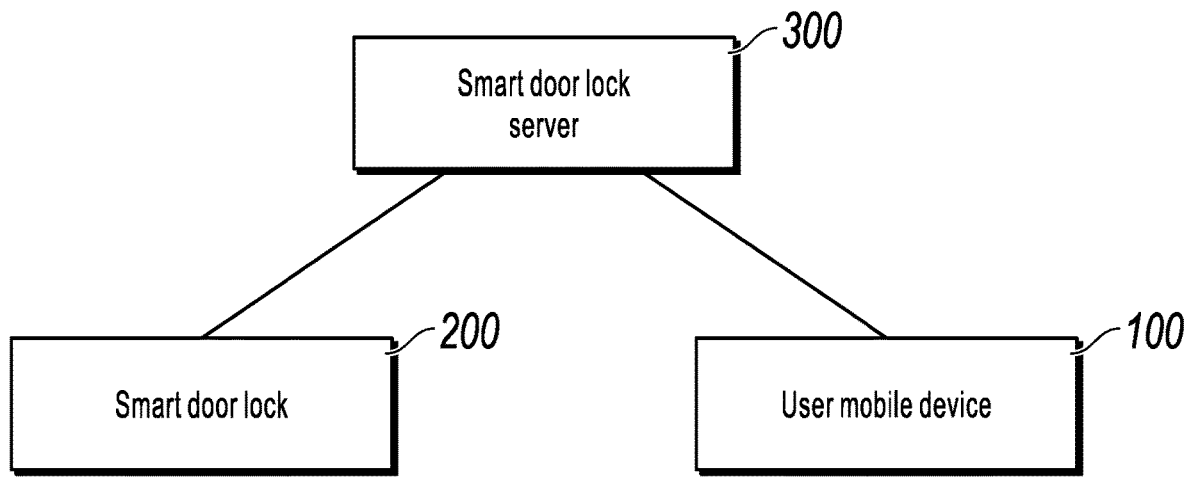
FIG. 1 is a schematic diagram illustrating multiple devices involved during unlocking, according to an implementation of the present application.

The following further describes the present application in detail with reference to accompanying drawings.

In a typical configuration of the present application, an end-user device and a network serving device each include one or more central processing units (CPU), one or more input/output interfaces, one or more network interfaces, and one or more memories.

The memory can include a non-persistent memory, a random access memory (RAM), anon-volatile memory, and/ or other forms that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program apparatus, or other data. A computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

Security and ease of use of a digital key can be conflicting concerns. If a digital key delivered each time becomes invalid after being used only once, security can be greatly improved. However, a user needs to apply for a key each time unlocking is needed, and therefore, user experience is poor. However, if the digital key delivered each time can be used for multiple times, and the digital key is illegally copied through a near field transmission channel by an attacker in a man-in-the-middle attack in the process of using the digital key, the attacker may illegally copy a door lock by using the digital key within a use validity time of the digital key. Therefore, relatively large security vulnerability exists. It can be understood that both security and ease of use cannot be satisfied in existing unlocking solutions.

An implementation of the present application provides an unlocking method. In the method, a digital key is generated for multiple times by using a digital key seed. Because the digital key includes first check data only corresponding to a current unlocking operation, an attacker cannot use the digital key to perform unlocking again even if the attacker obtains the digital key. In addition, because the digital key seed can be used for multiple times, a smart door lock server does not need to be connected each time to obtain the digital key. Therefore, both security and ease of use are satisfied.

In an actual scenario, unlocking can be implemented through interaction between multiple devices shown in FIG. 1. The multiple devices involved in FIG. 1 include a user mobile device 100, a smart door lock 200, and a smart door lock server 300. The smart door lock server 300 is configured to generate a digital key seed, and send the digital key seed to the user mobile device for use. When the user mobile device 100 needs to perform unlocking, the user mobile device 100 generates a digital key based on the obtained digital key seed and first check data corresponding to a current unlocking operation, and then sends the generated digital key to the smart door lock. After receiving the digital key from the user mobile device, the smart door lock 200 performs verification on the digital key seed and the first check data in the digital key, and performs unlocking after the verification succeeds.

The user mobile device can be any mobile electronic device that can perform data processing and transceiving, such as a mobile phone, a tablet, a smartwatch, a smart band, or smart glasses. In an actual scenario, data processing and transceiving logic involved in an unlocking method can be implemented by using an unlocking application running on the user mobile device. The smart door lock 200 can be a device that has data processing and transceiving functions and can control a door lock based on a data processing result. The smart door lock server 300 includes but is not limited to a network host, a single network server, a set of multiple network servers, a cloud computing-based computer set, etc., and can be configured to implement some processing functions of setting an alarm clock. Here, the cloud includes a large quantity of hosts or network servers based on cloud computing. The cloud computing is a type of distributed computing, and is performed by a virtual computer including a group of loosely coupled computer sets.

To improve security during unlocking, the first check data included in the digital key only corresponds to the current unlocking operation, in other words, the first check data can be related to a specific parameter of each unlocking operation. Therefore, an attacker cannot use the digital key to perform unlocking again even if the attacker obtains the digital key. In some implementations of the present application, the first check data can include unlocking count information, and the unlocking count information is equal to a quantity of times of generating a digital key based on the digital key seed. For example, the user mobile device can maintain a counter. After a new digital key seed is obtained, the counter can initialize unlocking count information to 0, and the unlocking count information dynamically increases by 1 each time a digital key is generated by using the digital key seed.

Logic of verification performed by the smart door lock based on the unlocking count information can be as follows: The smart door lock can store unlocking count information C1 of a previous unlocking operation, and compare unlocking count information C1 of the previous unlocking operation with unlocking count information C2 of a current unlocking operation during verification. If the unlocking count information of the previous unlocking operation is less than the unlocking count information of the current unlocking operation, the verification succeeds; or if the unlocking count information of the previous unlocking operation is not less than the unlocking count information of the current unlocking operation, the verification fails.

For example, if previous unlocking count information C1 stored on the smart door lock is 3, it indicates that digital key k1-3 is generated when digital key seed s1 is used for the third time. If digital key k1-3 is obtained by an attacker when being used (e.g., in the process of sending digital key k1-3 to the smart door lock), if the attacker directly uses digital key k1-3, and sends digital key k1-3 to the smart door lock to attempt to perform unlocking again, the smart door lock parses digital key k1-3 to find that unlocking count information C2 (i.e., the unlocking count information of k1-3) of the current unlocking operation is 3. Through comparison between C1 and C2, the smart door lock finds that C1=C2. Therefore, the verification fails, and no unlocking is performed. In normal situations, if a user needs to perform unlocking again after using digital key k1-3 once, the user uses digital key seed s1 again to generate new digital key k1-4. Unlocking count information corresponding to the digital key is increased by 1 on the basis of 3, which is 4. After the user mobile device sends digital key k1-4 to the smart door lock, the smart door lock parses received digital key k1-4 to find that unlocking count information C2 (i.e., unlocking count information of k1-4) of the current unlocking operation is 4. Through comparison based on C1 and C2, the smart door lock finds that C1<C2. Therefore, the verification succeeds, and unlocking is performed. Therefore, according to the unlocking solution provided in this implementation of the present application, verification is performed by using the first check data corresponding to the current unlocking operation, so that security is improved.

In some implementations of the present application, the user mobile device can obtain the digital key seed from the smart door lock server, or can obtain the digital key seed in another way, for example, the user mobile device directly generates the digital key seed. The user mobile device can obtain the digital key seed from the smart door lock server in the following way: The user mobile device sends an application request to the smart door lock server, and the smart door lock server generates the digital key seed based on the application request, and provides the digital key seed to the user mobile device.

In an actual scenario, before the user unlocks the smart door lock by using the user mobile device for the first time, the user needs to first apply for the digital key seed, and the user mobile device sends the application request to the smart door lock server during application. The application request can include at least user identity information and a user public key. The smart door lock server can generate a digital key seed related to the user identity information and the user public key based on the application request. The user public key can be generated by the user mobile device. For example, a key pair can be generated before the application, the key pair includes the user public key and a user private key, and the user identity information can be bound to the digital key seed. Therefore, security is improved.

In addition, to further improve security, the smart door lock server can further perform verification on the user identity information before generating the digital key seed related to the user identity information and the user public key based on the application request. For example, when the user identity information includes a mobile number of the user, the smart door lock server can send a verification code SMS message to the mobile number of the user when receiving the application request, so as to require the user to enter a verification code, thereby completing verification on the user identity information.

In some implementations of the present application, verification can be performed through digital signature, so that security is improved. Therefore, data in the digital key can include first to-be-signed data and a first signature obtained by signing the first to-be-signed data by using the user private key. The first to-be-signed data includes the digital key seed, the first check data corresponding to the current unlocking operation, and a first dynamic parameter. The first dynamic parameter can be a data element that can be obtained during generation of the digital key, for example, can be a parameter, such as a timestamp or a random number, that is difficult to be repeatedly obtained during generation of the digital key. After the first dynamic parameter is added to the first check data, because an attacker can hardly determine the data element, difficulty of performing a replay attack by the attacker can be increased.

In this implementation, the smart door lock can first perform verification on the digital key seed in the digital key when performing verification on the digital key seed and the first check data in the digital key and performing unlocking after the verification succeeds. After the digital key seed is verified, the smart door lock performs verification on the first signature in the digital key by using the user public key. Further, after the first signature is verified, the smart door lock performs verification on the first check data in the digital key, and performs unlocking after the verification succeeds. In an actual scenario, when performing verification on the first signature in the digital key by using the user public key, the smart door lock decrypts the first signature by using the user public key, to obtain an original text (i.e., the first to-be-signed data) encrypted by using the user private key, and further compares the original text with the first to-be-signed data included in the digital key. If both are consistent, it indicates that the first signature is verified.

In addition, if the user mobile device performs hash calculation on the first to-be-signed data before processing the first to-be-signed data by using the user private key, the original text obtained during verification of the smart door lock is a digest obtained after the hash calculation. In this case, the smart door lock needs to perform calculation on the first to-be-signed data included in the digital key by using the same hash algorithm, to obtain a digest. Then the smart door lock compares the digest with the digest obtained through decryption by using the user public key. If both are consistent, it indicates that the first signature is verified.

In some implementations of the present application, the digital key seed is generated by the smart door lock server. Data in the digital key seed can include second to-be-signed data and a second signature obtained by signing the second to-be-signed data by using a server private key, and the second to-be-signed data includes second check data and a second dynamic parameter related to the user identity information and the user public key. Similar to the first check data, the second check data is also information used for verification during unlocking. Because the digital key seed including the second check data can be used for multiple times, the second check data does not correspond to the current unlocking operation, and the second check data is always valid within a validity period of the digital key seed.

In this implementation, the second check data can include the user public key, a seed identifier bound to the user identity information, and the second dynamic parameter. The user public key matches the user private key, and the seed identifier is bound to the user identity information. Therefore, each user has a unique user public key and seed identifier. Similar to the first dynamic parameter, the second dynamic parameter can also be a parameter, such as a timestamp or a random number, that is difficult to be repeatedly obtained. After the second dynamic parameter is added to the second check data, difficulty of performing a replay attack by an attacker can be increased.

Based on the second check data in this implementation, the process of performing verification on the digital key by the smart door lock can include the following: The smart door lock performs verification on the second signature in the digital key seed by using a server public key. For a verification method of the second signature, references can be made to that of the first signature. Details are omitted here for simplicity. After the second signature is verified, the smart door lock performs verification on the second check data in the digital key seed. After the second check data is verified, the smart door lock performs verification on the first check data in the digital key, and performs unlocking after the verification succeeds.

Figure 2:
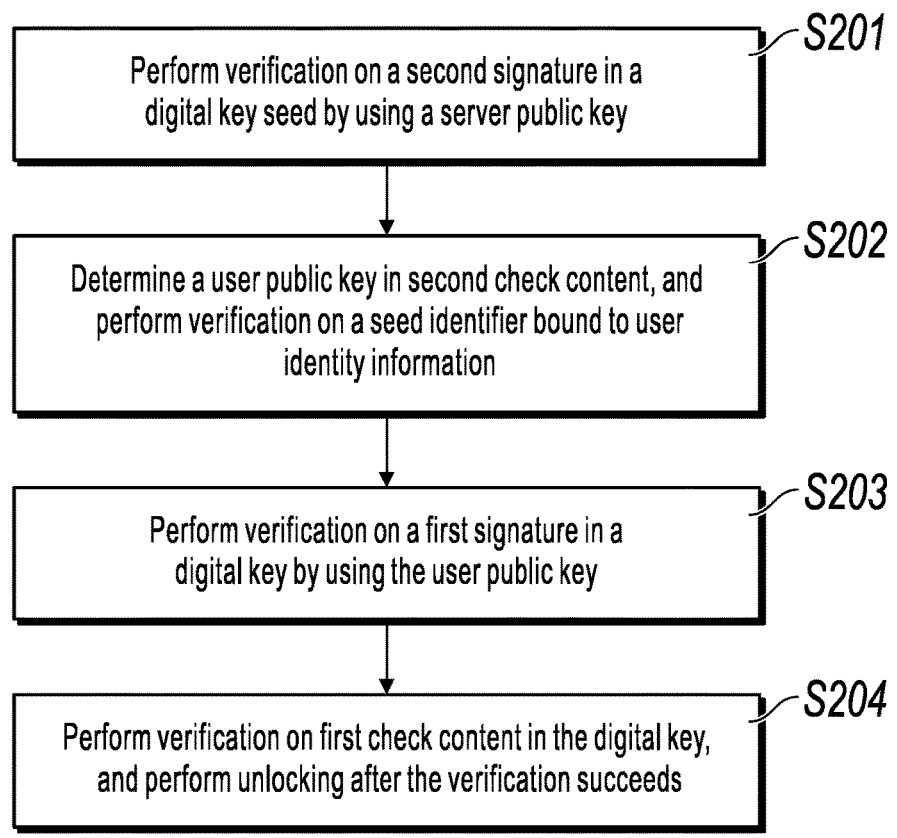
FIG. 2 is a flowchart illustrating processing when a smart door lock performs verification on a digital key, according to an implementation of the present application.

Based on the verification process of the first check data in the previous implementation, FIG. 2 shows a process of processing when a smart door lock performs verification on a digital key in some implementations of the present application. The process includes the following verification steps:

S201: The smart door lock performs verification on a second signature in a digital key seed by using a server public key.

S202: After the verification succeeds, the smart door lock determines a user public key in second check content, and performs verification on a seed identifier bound to user identity information.

S203: After the verification succeeds, the smart door lock performs verification on a first signature in the digital key by using the user public key.

S204: After the verification succeeds, the smart door lock performs verification on first check content in the digital key, and performs unlocking after the verification succeeds. The smart door lock does not perform unlocking if verification fails in any step during verification.

In addition, in some other implementations of the present application, the second check content can further include a seed validity time, so as to further improve security of this solution. The seed validity time is used to indicate a validity period of the digital key seed. Therefore, before performing unlocking, the smart door lock determines that a current time or a time of generating the digital key falls within the seed validity time. When the seed validity time expires, the smart door lock does not perform unlocking even if other verification succeeds. For example, the seed validity time can be set to one week after generation. To be specific, each digital key generated based on the digital key seed is valid only within one week after the digital key seed is generated. If passed one week, digital keys generated by using the digital key seed cannot be used for unlocking. Therefore, an attacker cannot successfully perform unlocking after the seed validity time expires even if other verification can succeed in a specific way, so that security of the solution is further improved.

Here, a person skilled in the art should understand that the previous process of processing when the smart door lock performs verification on the digital key is merely an example, and the verification sequence during verification can be adjusted based on needs of an actual application scenario. Therefore, other verification methods that exist currently or appear in the future should also fall within the protection scope of the present application, and are incorporated herein by reference if the other verification methods can be applied to the present application.

Figure 3:
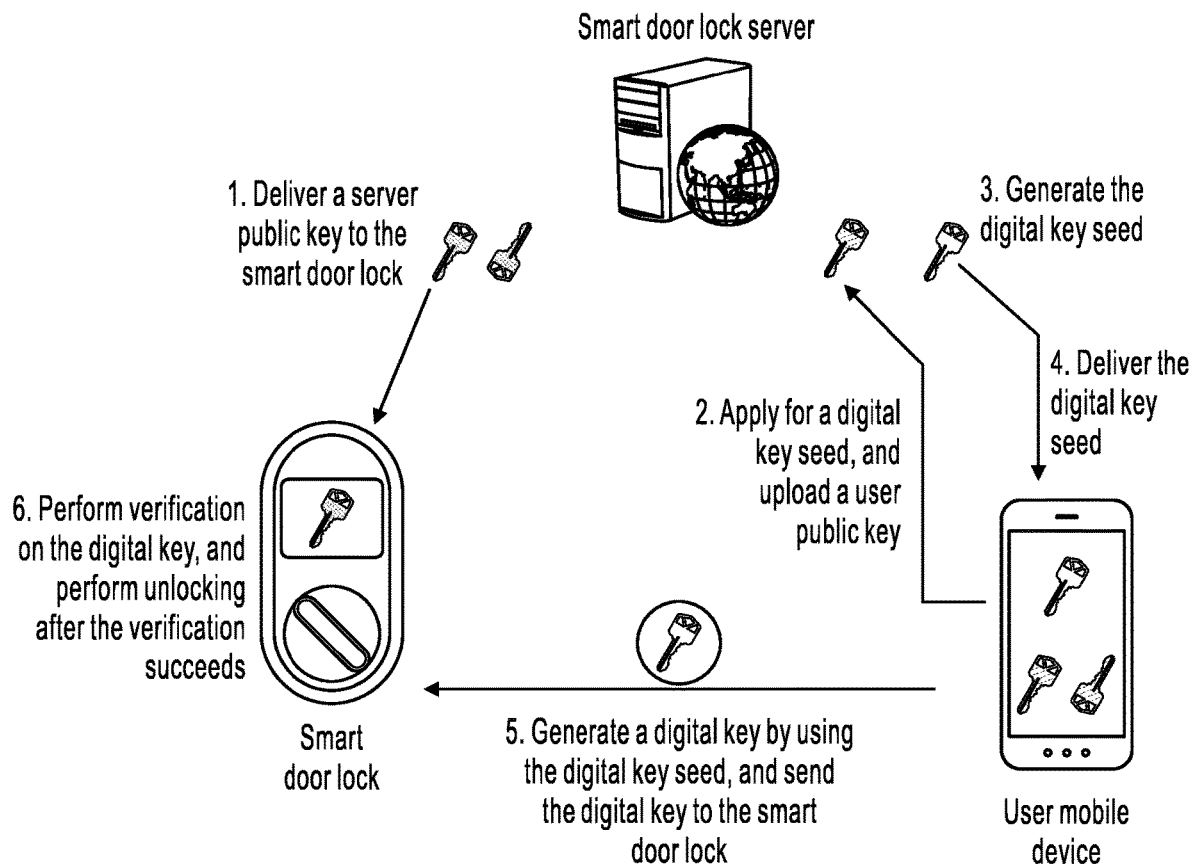
FIG. 3 is a flowchart of interaction between devices during unlocking by using the unlocking solution provided in the implementations of the present application.
Figure 3:
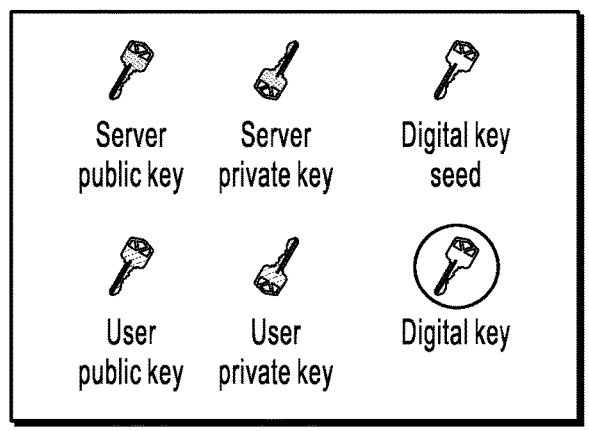
Figure 4:
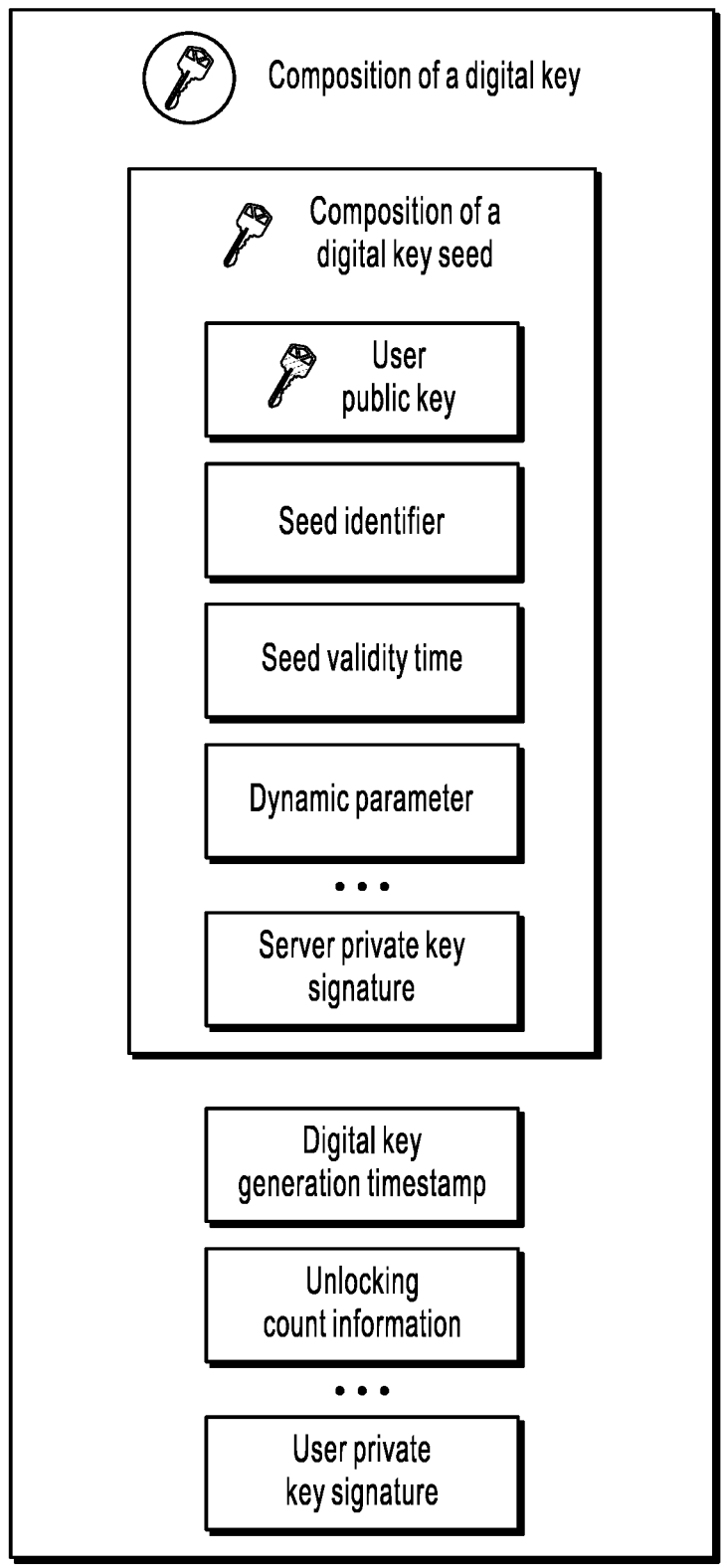
FIG. 4 is a schematic diagram illustrating data composition of a digital key, according to an implementation of the present application.

FIG. 3 shows a process of interaction between devices during unlocking by using the unlocking solution provided in the implementations of the present application. Data composition of a digital key in the solution can be shown in FIG. 4. The interaction process is as follows:

1. Predetermine a server public key of a smart door lock server in a smart door lock. For example, a manufacturer of a smart door lock sets the server public key when the smart door lock is delivered from the factory, or the smart door lock server delivers the server public key to a smart door lock when the smart door lock is initialized or in other situations.

2. A user applies for a digital key seed by using an application on a user mobile device. In this process, the application can generate a user key pair for the user, where a user private key is stored only on the user mobile device, and a user public key is uploaded to the smart door lock server in the process of applying for the digital key seed. When the user applies for the digital key seed, the smart door lock server performs verification on user identity information to determine whether the digital key seed can be delivered based on a user identity.

3. After the user identity information is verified, the smart door lock server generates the digital key seed by using a server private key. During generation, the smart door lock server generates second to-be-signed data by using the user public key, a seed identifier (which is used to identify the digital key seed and is bound to the user identity information), a validity time of the digital key seed, and some possible dynamic parameters (e.g., a generation timestamp), then signs the to-be-signed data by using the server private key to obtain a second signature, and generates the digital key seed based on the second to-be-signed data and the second signature.

4. The smart door lock server delivers the digital key seed to the user mobile device for storage, and stores the seed identifier after the seed identifier is transferred to the smart door lock in a secure way.

5. When the user performs an unlocking operation by using the application on the user mobile device, the application generates first to-be-signed data by using the digital key seed, a current timestamp, unlocking count information, and some possible dynamic parameters, and signs the first to-be-signed data by using the user private key to obtain a first signature, and generates the digital key based on the first to-be-signed data and the first signature. After generating the digital key, the application on the user mobile device transfers the digital key to the smart door lock by using a near field communications technology.

6. The smart door lock performs verification on the dynamic digital key.

The smart door lock performs verification on validity of the second signature corresponding to the server private key in the digital key seed by using the server public key. If the verification succeeds, the smart door lock considers that the user public key in the digital key seed is trusted, and can be used for other verification subsequently. The smart door lock further determines whether the seed identifier included in the digital key seed matches the seed identifier stored on the smart door lock. If both cannot match, unlocking fails; or if both can match, subsequent verification is performed. To be specific, verification is performed on validity of the first signature corresponding to the user private key in the digital key by using the user public key. If the verification succeeds, the smart door lock needs to compare previously stored unlocking count information C1 corresponding to a previous unlocking operation with unlocking count information C2 of the digital key obtained this time. If C1 is not less than C2, unlocking fails. In addition, the smart door lock can further verify whether the current timestamp in the digital key falls within the seed validity time. If the seed validity time expires, unlocking fails. It is considered that the digital key is valid and the smart door lock performs unlocking only after all verification succeeds.

Based on the same inventive concept, an implementation of the present application further provides a device for unlocking. The device for unlocking can be a user mobile device, a smart door lock server, or a smart door lock. A method corresponding to the device is the unlocking method implemented on each device in the previous implementation, and a problem solving principle of the device is similar to that of the method.

According to the device provided in this implementation of the present application, a digital key is generated for multiple times by using a digital key seed. Because the digital key includes first check data only corresponding to a current unlocking operation, an attacker cannot use the digital key to perform unlocking again even if the attacker obtains the digital key. In addition, because the digital key seed can be used for multiple times, a smart door lock server does not need to be connected each time to obtain the digital key. Therefore, both security and ease of use are satisfied.

In an actual scenario, unlocking can be implemented through interaction between multiple devices shown in FIG. 1. The multiple devices involved in FIG. 1 include a user mobile device 100, a smart door lock 200, and a smart door lock server 300. The smart door lock server 300 is configured to generate a digital key seed, and send the digital key seed to the user mobile device for use. When the user mobile device 100 needs to perform unlocking, the user mobile device 100 generates a digital key based on the obtained digital key seed and first check data corresponding to a current unlocking operation, and then sends the generated digital key to the smart door lock. After receiving the digital key from the user mobile device, the smart door lock 200 performs verification on the digital key seed and the first check data in the digital key, and performs unlocking after the verification succeeds.

The user mobile device can be any mobile electronic device that can perform data processing and transceiving, such as a mobile phone, a tablet, a smartwatch, a smart band, or smart glasses. In an actual scenario, data processing and transceiving logic involved in an unlocking method can be implemented by using an unlocking application running on the user mobile device. The smart door lock 200 can be a device that has data processing and transceiving functions and can control a door lock based on a data processing result. The smart door lock server 300 includes but is not limited to a network host, a single network server, a set of multiple network servers, a cloud computing-based computer set, etc., and can be configured to implement some processing functions of setting an alarm clock. Here, the cloud includes a large quantity of hosts or network servers based on cloud computing. The cloud computing is a type of distributed computing, and is performed by a virtual computer including a group of loosely coupled computer sets.

In some implementations of the present application, the user mobile device can include a seed acquisition module, a key generation module, and a data sending module. The seed acquisition module is configured to obtain a digital key seed. The key generation module is configured to generate a digital key based on the digital key seed and first check content corresponding to a current unlocking operation. The data sending module is configured to send the digital key to a smart door lock, so that the smart door lock performs verification on the digital key seed and the first check content in the digital key, and performs unlocking after the verification succeeds.

The smart door lock server can include a seed generation module and a data transceiver module. The seed generation module is configured to generate a digital key seed. The data transceiver module is configured to send the digital key seed to a user mobile device, so that the user mobile device generates a digital key based on the digital key seed and first check content corresponding to a current unlocking operation, and sends the digital key to a smart door lock, and the smart door lock performs verification on the digital key seed and the first check content in the digital key, and performs unlocking after the verification succeeds.

The smart door lock can include a data transceiver module, a verification processing module, and an unlocking action module. The data transceiver module is configured to receive a digital key from a user mobile device, where the digital key is generated by the user mobile device based on a digital key seed and first check content corresponding to a current unlocking operation. The verification processing module is configured to perform verification on the digital key seed and the first check content in the digital key. The unlocking action module is configured to perform unlocking after the verification succeeds.

To improve security during unlocking, the first check data included in the digital key only corresponds to the current unlocking operation, in other words, the first check data can be related to a specific parameter of each unlocking operation. Therefore, an attacker cannot use the digital key to perform unlocking again even if the attacker obtains the digital key. In some implementations of the present application, the first check data can include unlocking count information, and the unlocking count information is equal to a quantity of times of generating a digital key based on the digital key seed. For example, the user mobile device can maintain a counter. After a new digital key seed is obtained, the counter can initialize unlocking count information to 0, and the unlocking count information dynamically increases by 1 each time a digital key is generated by using the digital key seed.

Logic of verification performed by the smart door lock based on the unlocking count information can be as follows: The smart door lock can store unlocking count information C1 of a previous unlocking operation, and compare unlocking count information C1 of the previous unlocking operation with unlocking count information C2 of a current unlocking operation during verification. If the unlocking count information of the previous unlocking operation is less than the unlocking count information of the current unlocking operation, the verification succeeds; or if the unlocking count information of the previous unlocking operation is not less than the unlocking count information of the current unlocking operation, the verification fails.

For example, if previous unlocking count information C1 stored on the smart door lock is 3, it indicates that digital key k1-3 is generated when digital key seed s1 is used for the third time. If digital key k1-3 is obtained by an attacker when being used (e.g., in the process of sending digital key k1-3 to the smart door lock), if the attacker directly uses digital key k1-3, and sends digital key k1-3 to the smart door lock to attempt to perform unlocking again, the smart door lock parses digital key k1-3 to find that unlocking count information C2 (i.e., the unlocking count information of k1-3) of the current unlocking operation is 3. Through comparison between C1 and C2, the smart door lock finds that C1=C2. Therefore, the verification fails, and no unlocking is performed. In normal situations, if a user needs to perform unlocking again after using digital key k1-3 once, the user uses digital key seed s1 again to generate new digital key k1-4. Unlocking count information corresponding to the digital key is increased by 1 on the basis of 3, which is 4. After the user mobile device sends digital key k1-4 to the smart door lock, the smart door lock parses received digital key k1-4 to find that unlocking count information C2 (i.e., unlocking count information of k1-4) of the current unlocking operation is 4. Through comparison based on C1 and C2, the smart door lock finds that C1<C2. Therefore, the verification succeeds, and unlocking is performed. Therefore, according to the unlocking solution provided in this implementation of the present application, verification is performed by using the first check data corresponding to the current unlocking operation, so that security is improved.

In some implementations of the present application, the user mobile device can obtain the digital key seed from the smart door lock server, or can obtain the digital key seed in another way, for example, the user mobile device directly generates the digital key seed. The user mobile device can obtain the digital key seed from the smart door lock server in the following way: The user mobile device sends an application request to the smart door lock server, and the smart door lock server generates the digital key seed based on the application request, and provides the digital key seed to the user mobile device.

In an actual scenario, before the user unlocks the smart door lock by using the user mobile device for the first time, the user needs to first apply for the digital key seed, and the user mobile device sends the application request to the smart door lock server during application. The application request can include at least user identity information and a user public key. The smart door lock server can generate a digital key seed related to the user identity information and the user public key based on the application request. The user public key can be generated by the user mobile device. For example, a key pair can be generated before the application, the key pair includes the user public key and a user private key, and the user identity information can be bound to the digital key seed. Therefore, security is improved.

In addition, to further improve security, the smart door lock server can further perform verification on the user identity information before generating the digital key seed related to the user identity information and the user public key based on the application request. For example, when the user identity information includes a mobile number of the user, the smart door lock server can send a verification code SMS message to the mobile number of the user when receiving the application request, so as to require the user to enter a verification code, thereby completing verification on the user identity information.

In some implementations of the present application, verification can be performed through digital signature, so that security is improved. Therefore, data in the digital key can include first to-be-signed data and a first signature obtained by signing the first to-be-signed data by using the user private key. The first to-be-signed data includes the digital key seed, the first check data corresponding to the current unlocking operation, and a first dynamic parameter. The first dynamic parameter can be a data element that can be obtained during generation of the digital key, for example, can be a parameter, such as a timestamp or a random number, that is difficult to be repeatedly obtained during generation of the digital key. After the first dynamic parameter is added to the first check data, because an attacker can hardly determine the data element, difficulty of performing a replay attack by the attacker can be increased.

In this implementation, the smart door lock can first perform verification on the digital key seed in the digital key when performing verification on the digital key seed and the first check data in the digital key and performing unlocking after the verification succeeds. After the digital key seed is verified, the smart door lock performs verification on the first signature in the digital key by using the user public key. Further, after the first signature is verified, the smart door lock performs verification on the first check data in the digital key, and performs unlocking after the verification succeeds. In an actual scenario, when performing verification on the first signature in the digital key by using the user public key, the smart door lock decrypts the first signature by using the user public key, to obtain an original text (i.e., the first to-be-signed data) encrypted by using the user private key, and further compares the original text with the first to-be-signed data included in the digital key. If both are consistent, it indicates that the first signature is verified.

In addition, if the user mobile device performs hash calculation on the first to-be-signed data before processing the first to-be-signed data by using the user private key, the original text obtained during verification of the smart door lock is a digest obtained after the hash calculation. In this case, the smart door lock needs to perform calculation on the first to-be-signed data included in the digital key by using the same hash algorithm, to obtain a digest. Then the smart door lock compares the digest with the digest obtained through decryption by using the user public key. If both are consistent, it indicates that the first signature is verified.

In some implementations of the present application, the digital key seed is generated by the smart door lock server. Data in the digital key seed can include second to-be-signed data and a second signature obtained by signing the second to-be-signed data by using a server private key, and the second to-be-signed data includes second check data and a second dynamic parameter related to the user identity information and the user public key. Similar to the first check data, the second check data is also information used for verification during unlocking. Because the digital key seed including the second check data can be used for multiple times, the second check data does not correspond to the current unlocking operation, and the second check data is always valid within a validity period of the digital key seed.

In this implementation, the second check data can include the user public key, a seed identifier bound to the user identity information, and the second dynamic parameter. The user public key matches the user private key, and the seed identifier is bound to the user identity information. Therefore, each user has a unique user public key and seed identifier. Similar to the first dynamic parameter, the second dynamic parameter can also be a parameter, such as a timestamp or a random number, that is difficult to be repeatedly obtained. After the second dynamic parameter is added to the second check data, difficulty of performing a replay attack by an attacker can be increased.

Based on the second check data in this implementation, the process of performing verification on the digital key by the smart door lock can include the following: The smart door lock performs verification on the second signature in the digital key seed by using a server public key. For a verification method of the second signature, references can be made to that of the first signature. Details are omitted here for simplicity. After the second signature is verified, the smart door lock performs verification on the second check data in the digital key seed. After the second check data is verified, the smart door lock performs verification on the first check data in the digital key, and performs unlocking after the verification succeeds.

Based on the verification process of the first check data in the previous implementation, FIG. 2 shows a process of processing when a smart door lock performs verification on a digital key in some implementations of the present application. The process includes the following verification steps:

S201: The smart door lock performs verification on a second signature in a digital key seed by using a server public key.

S202: After the verification succeeds, the smart door lock determines a user public key in second check content, and performs verification on a seed identifier bound to user identity information.

S203: After the verification succeeds, the smart door lock performs verification on a first signature in the digital key by using the user public key.

S204: After the verification succeeds, the smart door lock performs verification on first check content in the digital key, and performs unlocking after the verification succeeds. The smart door lock does not perform unlocking if verification fails in any step during verification.

In addition, in some other implementations of the present application, the second check content can further include a seed validity time, so as to further improve security of this solution. The seed validity time is used to indicate a validity period of the digital key seed. Therefore, before performing unlocking, the smart door lock determines that a current time or a time of generating the digital key falls within the seed validity time. When the seed validity time expires, the smart door lock does not perform unlocking even if other verification succeeds. For example, the seed validity time can be set to one week after generation. To be specific, each digital key generated based on the digital key seed is valid only within one week after the digital key seed is generated. If passed one week, digital keys generated by using the digital key seed cannot be used for unlocking. Therefore, an attacker cannot successfully perform unlocking after the seed validity time expires even if other verification can succeed in a specific way, so that security of the solution is further improved.

Here, a person skilled in the art should understand that the previous process of processing when the smart door lock performs verification on the digital key is merely an example, and the verification sequence during verification can be adjusted based on needs of an actual application scenario. Therefore, other verification methods that exist currently or appear in the future should also fall within the protection scope of the present application, and are incorporated herein by reference if the other verification methods can be applied to the present application.

In conclusion, according to the unlocking solution provided in the implementations of the present application, after obtaining a digital key seed, a user mobile device can generate a digital key for multiple times by using the digital key seed and first check data corresponding to a current unlocking operation, and then send the digital key to a smart door lock for verification and unlocking. Because the digital key includes the first check data only corresponding to the current unlocking operation, an attacker cannot use the digital key to perform unlocking again even if the attacker obtains the digital key. In addition, because the digital key seed can be used for multiple times, a smart door lock server does not need to be connected each time to obtain the digital key. Therefore, both security and ease of use are satisfied.

Figure 5:
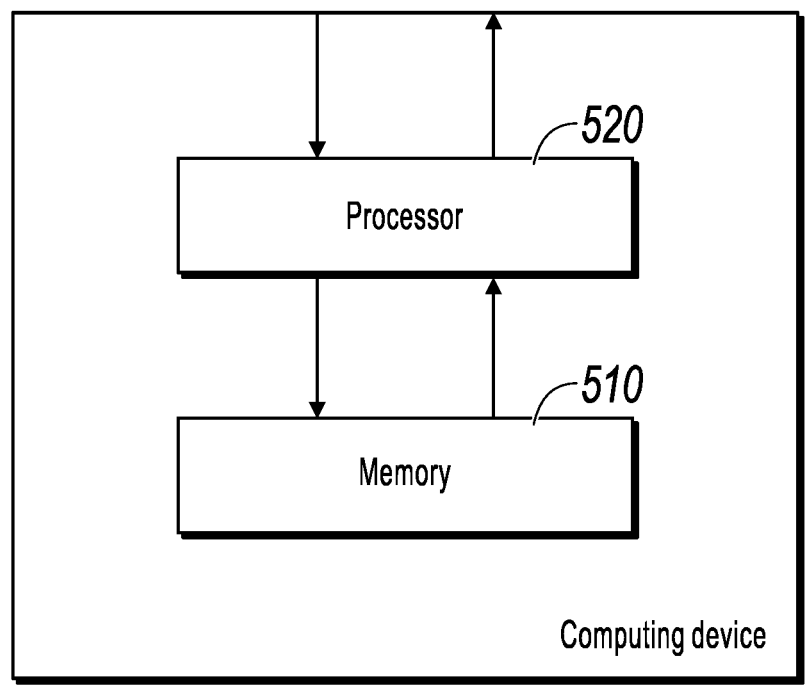
FIG. 5 is a schematic structural diagram illustrating a computing device that can be used for unlocking, according to an implementation of the present application.

In addition, a part of the present application can be implemented as computer program products such as a computer program instruction. When the computer program instruction is executed by a computer, at least one of the method and the technical solution according to the present application can be invoked or provided through operations of the computer. In addition, the program instruction for invoking the methods in the present application can be stored in a fixed or removable recording medium, and/or is transmitted through broadcast or a data flow in other signal bearer media, and/or is stored in an operating memory of a computer device that operates based on the program instruction. Here, some implementations of the present application include a computing device shown in FIG. 5. The device includes one or more memories 510 storing a computer readable instruction and one or more processors 520 configured to execute the computer readable instruction. When the computer readable instruction is executed by the processor, the device performs at least one of the method and the technical solution in the multiple implementations of the present application described above.

In addition, some implementations of the present application further provide a computer readable medium, where the computer readable medium stores a computer program instruction, and the computer readable instruction can be executed by a processor to implement at least one of the method and the technical solution in the multiple implementations of the present application described above.

It is worthwhile to note that the present application can be implemented in software and/or a combination of software and hardware. For example, the present application can be implemented by using an application-specific integrated circuit (ASIC), a general-purpose computer, or any other similar hardware device. In some implementations, a software program in the present application can be executed by a processor, so as to implement the previously described steps or functions. Similarly, the software program (including a related data structure) in the present application can be stored in a computer readable recording medium, for example, a RAM, a hard disk drive or a DVD-ROM/CD-ROM drive, or a floppy disk and a similar device. In addition, some steps or functions of the present application can be implemented by using hardware, for example, a circuit that cooperates with the processor to perform the steps or the functions.

It is clear to a person skilled in the art that the present application is not limited to the details of the previous example implementations, and the present application can be implemented in another specific form without departing from the spirit or essential feature of the present application. Therefore, the implementations should be considered as illustrative and not restrictive in every aspect, and the scope of the present application is limited by the appended claims, rather than the above description. Therefore, the present application covers all changes within the meaning and the scope of the equivalent elements of the claims. Any reference numeral in the claims should not be considered as a limitation on the related claim. In addition, it is clear that the word "include" does not exclude another unit or step, and the singular does not exclude the plural. Multiple units or apparatuses described in the apparatus claims can be implemented by one unit or apparatus by using software or hardware. The words such as "first" and "second" are used to indicate names instead of any particular order.

What is claimed is:

1. A computer-implemented method comprising:
obtaining, by a smart door lock, a server public key of a smart door lock server;
receiving, by the smart door lock from a user mobile device that generates a digital key from a digital key seed received from the smart door lock server, the digital key comprising the digital key seed and first check data;
performing, by the smart door lock, verification on the digital key seed corresponding to the digital key using the server public key of the smart door lock server;
performing, by the smart door lock, verification on the first check data of the digital key; and
based on performing verification on the digital key seed and the first check data, performing, by the smart door lock, unlocking of the smart door lock.

2. The method of claim 1, wherein the digital key seed comprises a user public key corresponding to a user of the user mobile device, the digital key comprises a first signature generated by a user private key corresponding to the user of the user mobile device, and performing verification on the digital key seed corresponding to the digital key comprises:
obtaining, by the smart door lock, the user public key in the digital key seed by using the server public key; and
performing, by the smart door lock, verification on the first signature by using the user public key.

3. The method of claim 1, wherein the first check data comprises unlocking count information.

4. The method of claim 3, wherein the unlocking count information is computed according to a number of times the user mobile device generates a digital key based on the digital key seed.

5. The method of claim 1, wherein the server public key is determined by a manufacturer of the smart door lock.

6. The method of claim 5, wherein the smart door lock obtains the server public key after a process of manufacturing the smart door lock.

7. The method of claim 1, wherein the digital key seed is generated using a server private key by a smart door lock server communicably connected to the smart door lock.

8. A non-transitory, computer-readable storage medium storing one or more instructions executable by a computer system to perform operations of a smart door lock comprising:
obtaining, by the smart door lock, a server public key of a smart door lock server;
receiving, from a user mobile device that generates a digital key from a digital key seed received from the smart door lock server, the digital key comprising the digital key seed and first check data;
performing verification on the digital key seed corresponding to the digital key using the server public key of the smart door lock server;
performing verification on the first check data of the digital key; and
based on performing verification on the digital key seed and the first check data, performing unlocking of the smart door lock.

9. The non-transitory, computer-readable storage medium of claim 8, wherein the digital key seed comprises a user public key corresponding to a user of the user mobile device, the digital key comprises a first signature generated by a user private key corresponding to the user of the user mobile device, and performing verification on the digital key seed corresponding to the digital key comprises:
obtaining the user public key in the digital key seed by using the server public key; and
performing verification on the first signature by using the user public key.

10. The non-transitory, computer-readable storage medium of claim 8, wherein the first check data comprises unlocking count information.

11. The non-transitory, computer-readable storage medium of claim 10, wherein the unlocking count information is computed according to a number of times the user mobile device generates a digital key based on the digital key seed.

12. The non-transitory, computer-readable storage medium of claim 8, wherein the server public key is determined by a manufacturer of the smart door lock.

13. The non-transitory, computer-readable storage medium of claim 12, wherein the smart door lock obtains the server public key after a process of manufacturing the smart door lock.

14. The non-transitory, computer-readable storage medium of claim 8, wherein the digital key seed is generated using a server private key by a smart door lock server communicably connected to the smart door lock.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations of a smart door lock comprising:
obtaining, by the smart door lock, a server public key of a smart door lock server;
receiving, from a user mobile device that generates a digital key from a digital key seed received from the smart door lock server, the digital key comprising the digital key seed and first check data;
performing verification on the digital key seed corresponding to the digital key using the server public key of the smart door lock server;
performing verification on the first check data of the digital key; and
based on performing verification on the digital key seed and the first check data, performing unlocking of the smart door lock.

16. The system of claim 15, wherein the digital key seed comprises a user public key corresponding to a user of the user mobile device, the digital key comprises a first signature generated by a user private key corresponding to the user of the user mobile device, and performing verification on the digital key seed corresponding to the digital key comprises:
obtaining the user public key in the digital key seed by using the server public key; and performing verification on the first signature by using the user public key.

17. The system of claim 15, wherein the first check data comprises unlocking count information.

18. The system of claim 17, wherein the unlocking count information is computed according to a number of times the user mobile device generates a digital key based on the digital key seed.

19. The system of claim 15, wherein the server public key is determined by a manufacturer of the smart door lock.

20. The system of claim 15, wherein the digital key seed is generated using a server private key by a smart door lock server communicably connected to the smart door lock.

* * * * *